Sept. 11, 1956　　　　　C. C. HALL　　　　　2,762,180
ARTICLE COUNTING AND PACKAGING APPARATUS
Filed June 18, 1953　　　　　　　　　　　　7 Sheets—Sheet 1

FIG. 1.

*INVENTOR.*
CLAUDE C. HALL
BY
ATTORNEYS

Sept. 11, 1956  C. C. HALL  2,762,180
ARTICLE COUNTING AND PACKAGING APPARATUS
Filed June 18, 1953  7 Sheets-Sheet 4

FIG. 4A.

INVENTOR.
CLAUDE C. HALL
BY
ATTORNEYS

Sept. 11, 1956 C. C. HALL 2,762,180
ARTICLE COUNTING AND PACKAGING APPARATUS
Filed June 18, 1953 7 Sheets-Sheet 5

FIG. 4B.

INVENTOR.
CLAUDE C. HALL
BY Busser, Smith & Harding
ATTORNEYS.

Sept. 11, 1956    C. C. HALL    2,762,180
ARTICLE COUNTING AND PACKAGING APPARATUS
Filed June 18, 1953    7 Sheets-Sheet 6

FIG. 5.

INVENTOR.
CLAUDE C. HALL
BY Busser, Smith & Harding
ATTORNEYS

FIG. 8.

United States Patent Office 2,762,180
Patented Sept. 11, 1956

2,762,180

ARTICLE COUNTING AND PACKAGING APPARATUS

Claude C. Hall, Pitman, N. J., assignor to Smith, Kline & French Laboratories, Philadelphia, Pa., a corporation of Pennsylvania Application June 18, 1953, Serial No. 362,506

12 Claims. (Cl. 53—202)

This invention relates to article counting and packaging apparatus and, more particularly, to apparatus for filling containers with predetermined numbers of articles of generally small size such as, for example, tablets and capsules of medicaments.

In the packaging of small articles, it is desirable to feed the articles from a hopper to counting means and to deliver the articles in predetermined numbers to suitable containers such as, for example, bottles or boxes. In such an apparatus it is desirable to have the containers fed to the counting apparatus in groups with each positioned before the counting apparatus in a position to receive a counted number of articles and thereafter moved away from the counter generally simultaneously with the delivery of a succeeding group of containers to the counting apparatus. It is additionally desirable that the counting apparatus include means for arresting the operation thereof upon an erroneous count. Furthermore, the apparatus should be entirely automatic in its operation and require in attendance a minimum number of operators.

It is among the objects of this invention to provide an apparatus which will accommodate the foregoing considerations.

This and other objects of the invention will become apparent from the following description when read in conjunction with the accompanying drawings, in which.

Referring to the figures, the apparatus includes a framework 2 which supports a pair of frame side plates 4 and 6 extending upwardly above the framework 2. The plates 4 and 6 are maintained in alignment with each other by means of a plurality of transversely extending rods 8.

An endless article carrying conveyor indicated generally at 10 is adapted to move in a generally clockwise direction between the plates 4 and 6. The conveyor includes a pair of endless chains 12 and 14 positioned adjacent to the plates 4 and 6, respectively. The chains 12 and 14 support transversely extending conveyor bars 16 which are positioned with reduced thickness end portions 18 resting upon the chains and held in position thereon by spring clips 20 and pins 21 which are affixed to the chains and extend upwardly therefrom. The right-hand portions of the endless chains 12 and 14, as viewed in Figure 4B, are supported by a pair of bars 22 and 24 mounted on the side plates 4 and 6, respectively, by means of studs 23. The bars 22 and 24 guide the conveyor generally upwardly to the right, as viewed in Figure 4B, and thereafter portions 26 of the bars guide the conveyor generally downwardly to the right to the front of the machine and succeeding portions 28 of the bars guide the conveyor around its lower right-hand bend as the lower portion of the conveyor moves to the left in Figure 4B. The lower portion of the conveyor, which moves to the left as viewed in Figures 4A and 4B, is supported by a pair of bars 29 mounted on the side plates 6 and 8 by studs similar to studs 23.

Figure 4A:
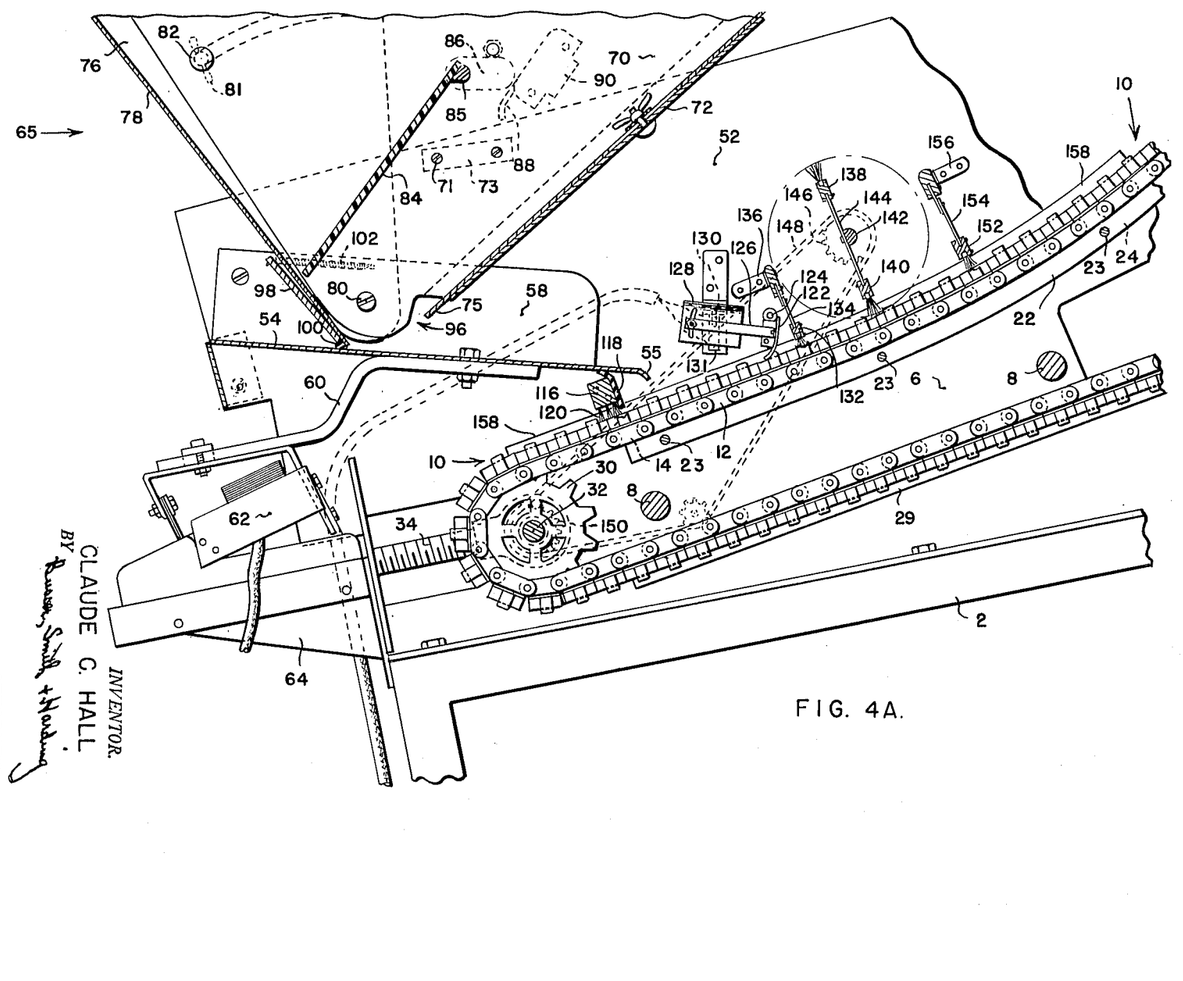
Figure 4A is a vertical section through the rear portion of the apparatus.
Figure 4B:
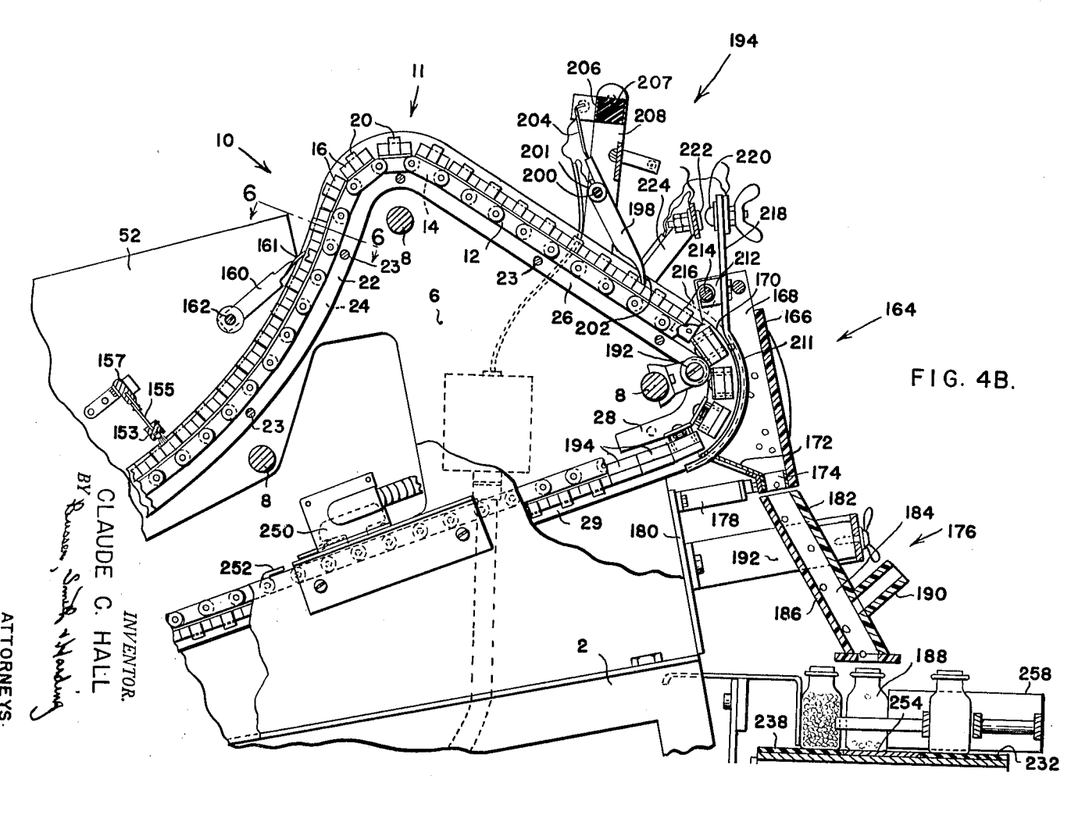
Figure 4B is a vertical section through the front portion of the apparatus.

The left-hand portions of the conveyor chains 12 and 14, as viewed in Figure 4A, are supported by a pair of sprocket wheels 30 which are mounted on a shaft 32. The shaft 32 is mounted on suitable bearings, not shown, which are slidably mounted on the framework 2 and are adjustably positioned by means of take-up bolts 34 and nuts 36 thereon bearing against plates 38 affixed to the framework 2. It will be evident that, by adjustment of the nuts 36, a take-up is provided for the conveyor 10.

A motor 40 is mounted in the framework 2 and drives a speed reducer 42 the output of which is coupled through a sprocket gear 44 and a chain 46 to a sprocket wheel 48 mounted on the shaft 32. The motor 40 thus serves to drive the conveyor 10 previously described.

A pair of upper side plates 50 and 52 extend upwardly above the conveyor at either side thereof and are supported from the side plates 4 and 6, respectively, by brackets 51 and 53. The lower edges of the plates 4 and 6 are positioned sufficiently close to the conveyor bars to prevent the passage of articles thereunder.

Extending between the plates 50 and 52 is a transverse plate 54 having upwardly turned side portions 56 and 58. The plate 54 is mounted on a support plate 60 which is in turn affixed to a vibrator 62. The vibrator 62 is mounted on plates 64 affixed to the framework 2. The vibrator 62 may be of conventional type and need not be described in detail herein.

A hopper indicated generally at 65 is mounted above the plate 54 and includes a pair of side plates 68 and 70 which are joined by a transversely extending plate 72 and extend toward the rear of the machine from the plate 72. The plates 68 and 70 are supported from the plates 50 and 52, respectively, by means of studs 71 passing through the plates and spacer bars 73. A pair of hopper plates 74 and 76 are joined by a transversely extending plate 78 and extend toward the front of the machine from the plate 78. The rearwardly extending side plates 68 and 70 and the forwardly extending side plates 74 and 76 are adjustably positioned with respect to each other by virtue of their connection through pivots 80. The plates may be locked in any desired relative position within the limits provided by a wing nut 81 threaded on a locking screw 82 which is affixed to the plate 68 and slidable within an arcuate slot 83 in the plate 74.

A flap member 84 is suspended within the hopper assembly 65 by attachment of its upper end to a transversely extending shaft 85. The shaft 85 extends outwardly through the plate 70 and has attached to the outer end thereof a blade 86 which, as the shaft 85 rotates in a clockwise direction as viewed in Figure 4A, is adapted to engage a blade 88 extending from a switch 90. The switch 90 is adapted to control apparatus 92 contained within a feed hopper 94 for controlling the flow of articles out of the feed hopper 94 into the hopper indicated generally at 65. The feed hopper 94 and the control for articles flowing therefrom may be any conventional apparatus and need not be described in detail herein.

The hopper 65 is provided with an opening at the lower portion thereof between the plates 72 and 78, as indicated generally at 96, to permit articles which have been deposited in the hopper to flow outwardly therefrom onto the plate 54. A plate 75 is adjustably positioned on the plate 72 and serves to adjust the size of the opening 96 in the bottom of the hopper.

A plate 98 extends transversely of the hopper 65 toward the rear thereof and is pivotally mounted on a transversely extending shaft 100 which is mounted in the upturned portions 56 and 58 of the plate 54. The shaft 100 rests upon the plate 54 and prevents the passage of articles from the hopper 65 to the left of the plate 54 as viewed in Figure 4A. A spring 102 urges the plate 98 to rotate in a clockwise direction around the shaft 100, as viewed in Figure 4A, and thus apply a constant force upon the rear plate 78 of the hopper. Thus, if the locking nut 81 on the screw 82 should become loosened, the spring 102 will act to draw the rear portion of the hopper upwardly and thus a flooding of the apparatus with articles to be counted and packaged will be avoided as will be more fully described hereinafter.

Operation of the apparatus thus far disclosed may now be described. Small articles are fed into the hopper 65 from the feed hopper 94 under the control of apparatus indicated generally at 92. The articles falling into the hopper 65 will cause the flap member 84 to be moved to the left rotating the shaft 85. As the flap member moves to the left and upwardly to a point where the blade 86 actuates the switch 90, the switch 90 serves to actuate the controlling apparatus 92 terminating the flow of articles from the feed hopper 94 to the hopper 65. Thus the deposition of an excessive number of articles in the hopper 65 is avoided.

Articles from the hopper 65 pass outwardly therefrom through the opening 96 in the bottom thereof and flow across the plate 54 and over the lip 55 thereof onto the surface of the conveyor 10. The movement of the conveyor is in a generally clockwise direction, as viewed in Figure 4A, the conveyor being driven by the motor 40 through the shaft 32 and the sprocket wheels 30 as previously described. The movement of the upper surface of the conveyor will carry the articles to the right as viewed in Figure 4A.

Figure 6:
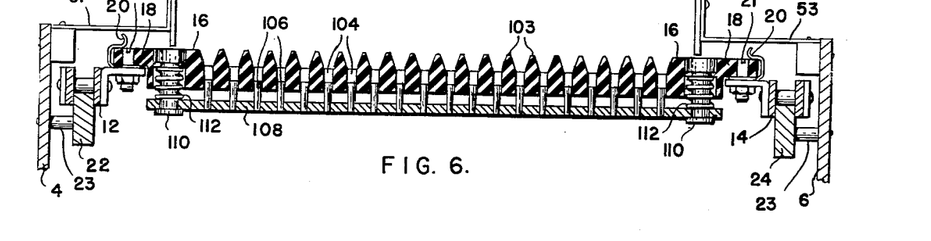
Figure 6 is a fragmentary section through a portion of the apparatus taken on the trace 6—6 of Figure 4B.
Figure 7:
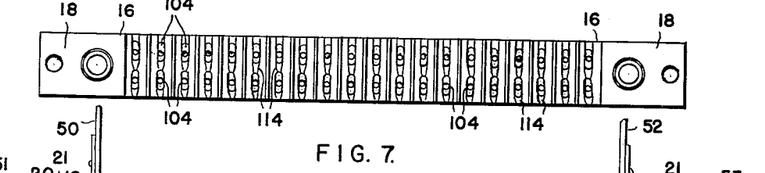
Figure 7 is a plan view of the conveyor element shown in section in Figure 6.

The conveyor bars 16, as shown in Figures 6 and 7, are each provided with a plurality of teeth 103 extending transversely of the bars and in the direction of travel of the conveyor. In each of the grooves between the teeth is a pair of recesses 104. Pins 106 extend through bores in the bars 16 into the bottom portions of the recesses 104. The lower ends of the pins 106 are affixed to a plate 108. The plate is supported by headed studs 110 which pass through bores at each end of the plate 108 and are mounted in the bars 16. A spring 112 is provided on each of the studs 110 to urge the plate 108 outwardly or downwardly with respect to the bars 16 as viewed in Figure 6 and against the heads of the studs 110 maintaining the upper ends of the pins 106 flush with the base of the recesses 104. Each recess 104 is provided with an inclined edge surface 114 along its leading edge.

A bar 116 extends transversely between the side plates 50 and 52 and supports a rubber sheet 118 extending upwardly from the bar 116 into engagement with the underside of the plate 54. A plurality of bristles 120 are mounted in and extend downwardly from the bar 116 and serve to brush the surface of the conveyor bars 16 as they pass thereunder.

A blade 122 extends transversely across the conveyor between the plates 50 and 52 and is pivotally attached at its upper edge to a transversely extending bar 124. Extending to the left of the blade 122, as viewed in Figure 4A, and attached thereto is an arm 126 to which is affixed a plate 128 adapted to depress a roller 130 actuating a limit switch 131 when the blade 122 is rotated in a clockwise direction around the bar 124 from the position in which it is shown in Figure 4A.

A brush 132 extends transversely of the conveyor and is supported at either end adjacent to the side plates 50 and 52 by spring blades 134 affixed to the side plates by brackets 136.

A pair of transversely extending brushes 138 and 140 are attached by means of spaced spring blades 144 to a shaft 142. The shaft 142 extends through plates 50 and 52 and is supported by brackets 143 extending upwardly from the plates 4 and 6. The shaft is driven by a sprocket gear 146 over which passes a chain 148 which is in turn driven by a sprocket gear 150 attached to the shaft 32 previously described. Operation of the drive motor 40 will cause the brushes 138 and 140 to rotate in a clockwise direction as viewed in Figure 4A.

An additional transversely extending brush 152 is supported by spaced spring bars 154 which are attached to mounting brackets 156 affixed to the side plates 50 and 52.

A second additional transversely extending brush 153 is supported by spaced spring bars 155 which are attached to mounting brackets 157 affixed to the side plates 50 and 52.

As previously described, the conveyor chains 12 and 14 of the conveyor 10 are moved in a generally clockwise direction as viewed in Figure 4A. A pair of bars 158 is mounted on the side plates 4 and 6 above the chain in order to locate the conveyor bars 16 with respect to the brushes 132, 138, 140, 152 and 153 previously described.

Articles being discharged from the hopper 65 and passing over the plate 54 are deposited on the moving conveyor bars 16 and are carried to the right as viewed in Figure 4A. The articles pile up behind the blade 122 and spill over the top of the blade 122 accumulating between the blade 122 and the brush 132. When a sufficient number of articles have accumulated between the blade 122 and the brush 132, they cause the lower part of the blade 122 to move to the left, as viewed in the figure, raising the plate 128 and actuating the limit switch 131. As will be hereinafter described in conjunction with the wiring diagram of Figure 8, operation of the limit switch 131 controls the vibrator 62 and thus, when a sufficient number of articles to actuate the limit switch 131 accumulate behind the brush 132, vibrator operation is terminated and movement of the articles from the hopper to the conveyor is retarded. Articles passing under and over the brush 132 are carried forwardly by the conveyor bars 16.

It should be noted that operation of the vibrator 62 will not only cause vibration of the plate 54 but will also cause a sufficient amount of vibration to the hopper 65 to increase the rate of discharge of articles therefrom.

The rotating brushes 138 and 140 and the stationary brushes 152 and 153 further serve to prevent an excessive number of articles from being carried forward by the conveyor. The brushes also serve the essential function of agitating and spreading the articles and thereby inducing them to fill all of the recesses 104 in the conveyor bars 16 and thus, as the conveyor bars move to the right and upwardly over the bars 22 and 24, there are carried by the conveyor substantially only the articles which are retained in the recesses 104.

A plurality of independent fingers 160 are mounted with freedom to rotate on a transversely extending shaft 162 which is supported by the side plates 50 and 52. The ends 161 of the fingers rest upon the conveyor bars 16 by the action of gravity and are so spaced that their uppermost or right-hand end portions rest upon the conveyor bars 16 and pass within the slots between the teeth 103 of the conveyor bars as the conveyor bars move under the fingers. Thus any articles which are carried upwardly by the conveyor bars to this point and not lodged in recesses 104 therein are dislodged from the conveyor bars by the fingers 160 and tumble back down the conveyor to the left as viewed in Figure 4B. It will be evident that the bars of the conveyor passing over the highestmost portion of the conveyor track, as indicated generally at 11 in Figure 4B, will carry only articles which are deposited in the recesses 104 in the conveyor bars 16 and no additional articles will be carried by the conveyor bars to this point.

Figure 1:
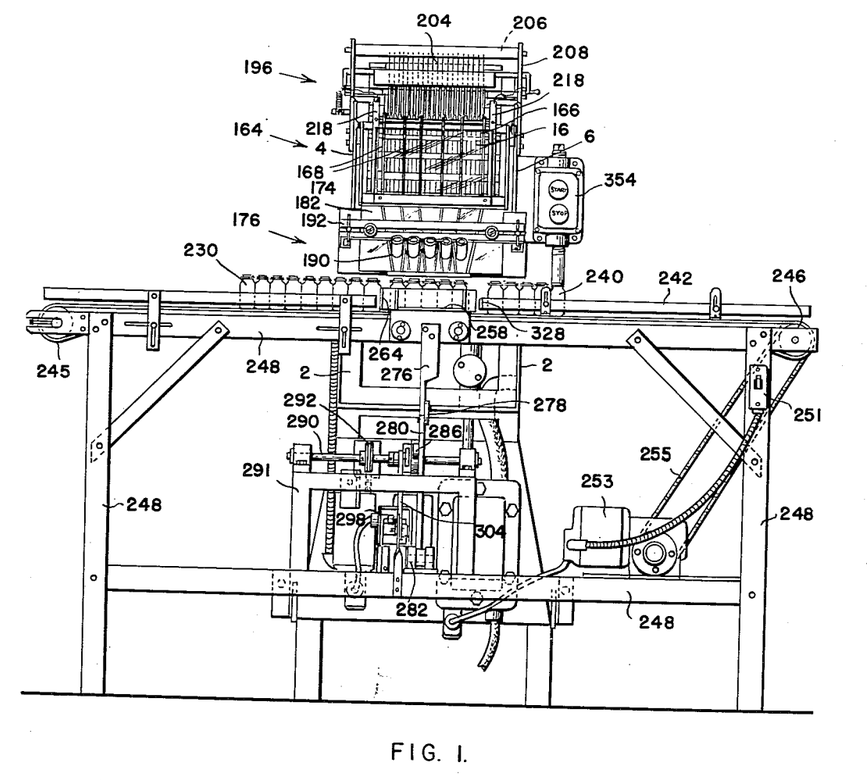
Figure 1 is a front elevation of the apparatus.

As shown generally at 164 in Figures 1 and 4B, there is provided at the front of the machine an upper article receiver for receiving and guiding articles discharged from the conveyor bars 16. The upper receiver 164 includes a transversely extending plate 166 preferably formed of a transparent plastic material and partition plates and end plates 168 having their rear surface 170 arcuately formed in order to match with slight clearance the curvature of the portion of the conveyor passing thereby around the guide bar 28 previously described.

The rear portion of the underside of the spaces between the partition plates 168 is closed by an inclined transversely extending plate 172. The front plate 166, the partition plates 168 and the bottom plate 172 cooperate at their lower ends to form a plurality of downwardly extending openings 174 which are adapted to guide falling articles into a lower receiver indicated generally at 176 in Figures 1 and 4B. The upper receiver 164 is supported by means of a bracket 178 which is affixed to a plate 180 extending transversely between the side plates 4 and 6 and extending upwardly from the framework 2.

The lower receiver 176 includes a transversely extending front plate 182, vertically extending partition plates 184 and a transversely extending rear plate 186. All of these plates are also preferably formed of a transparent plastic material to permit an operator to observe the passage of articles therethrough. The passages formed between the front and rear plates 182 and 186 and the partition plates 184 are in alignment with the openings 174 of the upper receiver assembly 164 and are positioned to direct tablets falling therethrough into bottles 188 which will be hereinafter described in greater detail. Observation tubes 190 are provided extending outwardly from each of the passages through the lower receiver to permit an operator to gain access to the downwardly extending passage therein in the event that articles passing therethrough should become jammed therein. The lower receiver assembly is supported by means of a bracket 192 affixed to the plate 180.

As the conveyor bars 16, previously described, pass around the curved portions 28 of the guide bars 22 and 24 at the forwardmost portion of their travel, they pass over a pair of rollers 192 which are supported from the forwardmost transversely extending bar 8 mounted in the side plates 4 and 6. The rollers 192 are positioned so as to engage the rear plate 108 of each of the conveyor bars 16 at the outward end portions thereof and inwardly of the headed studs 110. Thus, as the conveyor bars 16 pass over the rollers 192, plates 108 and pins 106 carried thereby are pressed outwardly toward the front of the machine and the pins rise upwardly in the recesses 104 in the conveyor bars 16 insuring the discharge of articles from the conveyor bars which have been retained in the recesses 104 therein.

By viewing Figure 1 it will be evident that each of the passages formed in the upper receiver assembly 164 receives articles discharged from a predetermined number of recesses in each of the conveyor bars and, by providing a succession of conveyor bars of a predetermined number containing the recesses described, a predetermined number of articles will be discharged by the succession of conveyor bars into each of the passages in the receiver assemblies and, thus into each of the bottles 188.

The conveyor assembly is so arranged as to have a succession of groups of conveyor bars 16 of predetermined number each having recesses such as those bars shown in Figures 6 and 7. Between these predetermined numbers of bars of each group there are provided a plurality of bars as indicated at 194 in Figure 4B which are not provided with recesses. These solid bars, having smooth outer surfaces, carry no articles, and thus, as they pass the article receiver assemblies, discharge no articles for delivery to the containers. The number of bars in a succession and number of recesses of each bar discharged into a bottle will determine the number of articles delivered to each bottle by a succession of bars.

During the passage of blank conveyor bars past the receivers, the filled bottles may be replaced with empty bottles adapted to receive articles discharged from the next succession of recessed conveyor bars. This replacement of bottles will be hereinafter described.

It will be evident from the foregoing that the apparatus thus far described will serve to deliver to each of a group of bottles 188 an exact number of articles provided that each recess 104 in the recessed conveyor bars 16 carries an article as the bars pass the upper receiver assembly. In order to guard against the possibility of one or more of the recesses being devoid of an article, a plurality of feeler fingers, as indicated generally at 196 in Figure 1 and numbered 198 in Figure 4B, are provided. These fingers are mounted in side by side relation on a transversely extending shaft 200. Each of these fingers has a lower end 202 which rests upon the conveyor by the force of gravity and is adapted to pass between the teeth 103 of the conveyor bars. The fingers 198 are separated by insulating spacers 201 and are connected to a control circuit through the shaft 200 which is mounted in insulating bushings in the upstanding brackets 208 attached to the side plates 4 and 6. It will be evident that individual flexible conductors may be directly connected to each of these fingers in order to connect them into the control circuit. The lower ends 202 of the fingers rest upon the conveyor bars 16 which are also formed of insulating material. The upper ends of the fingers are each provided with the contact member 204 which is so positioned as to engage a transversely extending contact bar 206 mounted on an insulating bar 207 supported by the upstanding brackets 208. When the end 202 of a finger passes over a recess 104 in a conveyor bar which does not contain an article, it drops into the recess and contact of its contact member 204 with the contact bar 206 results and serves to arrest the operation of the apparatus as will be described in conjunction with the wiring diagram of Figure 8.

An additional safety device is provided to arrest the operation of the machine in the event that one of the conveyor bars 16 is pressed out of its retaining clips 20 by the action of the rollers 192 upon the pin mounting plate 108. This apparatus includes a pair of arcuately formed bars 211 positioned adjacent to the outer surface of the conveyor bars 16 passing around the guide bar 28 at the extreme right end of the machine and under the receiver assembly 164. The arcuately formed bars 211 are each pivotally mounted by means of brackets 212 mounted on a transversely extending rod 214 which is supported by support brackets 216 affixed to the side plates 4 and 6. The bars 211 each have upwardly extending portions 218 which mount at their upper ends contact members 220. Each of the contact members 220 associated with an emergency bar 211 is adapted to cooperate with a stationary contact 222. The two stationary contacts 222 are mounted on bars 224 extending upwardly from the side plates 4 and 6. It will be evident that the contact 222 shown in Figure 4B is supported by a bar 224 extending upwardly from the side plate 4 cut away in Figure 4B and that the support bar 224 serves to mount a contact identical to that shown at 222 and positioned immediately behind the contact 222 in Figure 4B. This safety apparatus serves to interrupt the operation of the machine as will be described in conjunction with the wiring diagram of Figure 8 if either end of any of the conveyor bars 16 are displaced forwardly or to the right, as viewed in Figure 4B, out of their retaining clips 20 by the action of either of the rollers 192.

From the foregoing, it will be evident that successive groups of accurately counted articles will be delivered to the receiver assemblies and pass therethrough into various bottles, as indicated at 188 and, in the event of the failure of one of the conveyor bar recesses to carry articles, the operation of the machine will be interrupted by a corresponding finger 198 and an operator may then immediately supply the missing article and reinitiate the operation of the machine. The missing article could be automatically supplied if desired in response to a signal from a finger 198.

The delivery and removal of bottles 188 may now be described. Bottles indicated generally at 230 in Figure 1 are carried toward their loading position on a conveyor belt 232. Guide plates 234 and 236 are adjustably positioned with respect to the conveyor 232 in order to retain the containers properly transversely positioned in alignment upon the conveyor.

Bottles 240 having been filled with articles, are carried from the filling position by a conveyor belt 238. Guide bars 242 and 244 are provided to position the filled bottles upon the conveyor 238 as they are carried away from their filling position.

While bottles are referred to herein as receiving the counted articles, it will be evident that any suitable type of container may be employed.

The conveyor belts 232 and 238 are mounted over a pair of rollers 245 and 246 supported by a framework 248. The containers may be loaded onto the conveyor belt 232 in any conventional manner and removed from the conveyor belt 238 in any conventional manner including removal by a subsequent conveyor belt properly positioned in alignment with the belt 238. A motor and speed reducer 253 is mounted on the framework 248 and is adapted to drive the roller 246 through a chain 255 and conventional sprocket wheels mounted on the speed reducer shaft and the shaft of the roller 246.

A plate 254 is positioned between the conveyor belts 232 and 238 immediately below the lower ends of the passages in the receiver assembly 176. Bottles 188 are adapted to be positioned on the plate 254 in order to receive the articles passing downwardly through the passages in the lower receiver assembly. The apparatus for positioning the bottles 188 includes a plate 258 having an upstanding flange 260 extending parallel to the conveyors and adjustably attached thereto, a bar 262 having its left-hand end as viewed in Figure 3 formed at a right angle as indicated at 264.

Figure 5:
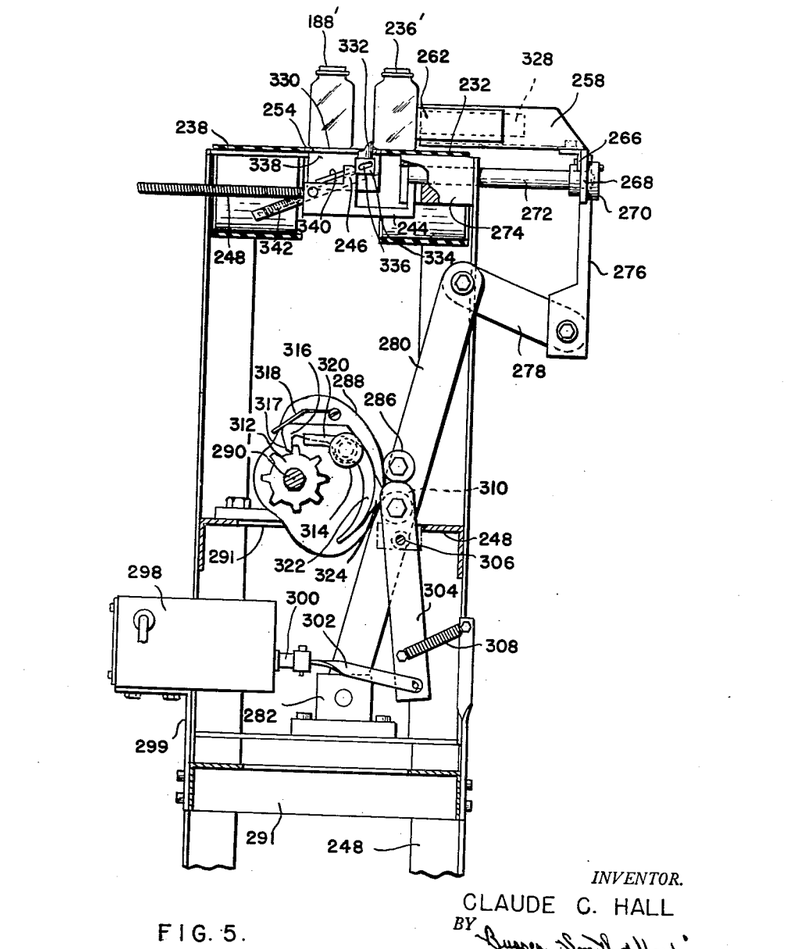
Figure 5 is a vertical section through a portion of the apparatus taken on the trace 5—5 of Figure 3.

The outer end of the plate 258 or the right-hand end thereof, as viewed in Figure 5, is adjustably attached to a bracket 266 which is, in turn, affixed to a flat bar 268 supported by members 270 which are mounted on the ends of horizontally extending rods 272. The rods 272 are adapted to pass into bores in a block 274 supported by the framework 248 and to move transversely of the conveyor 232.

Figure 2:
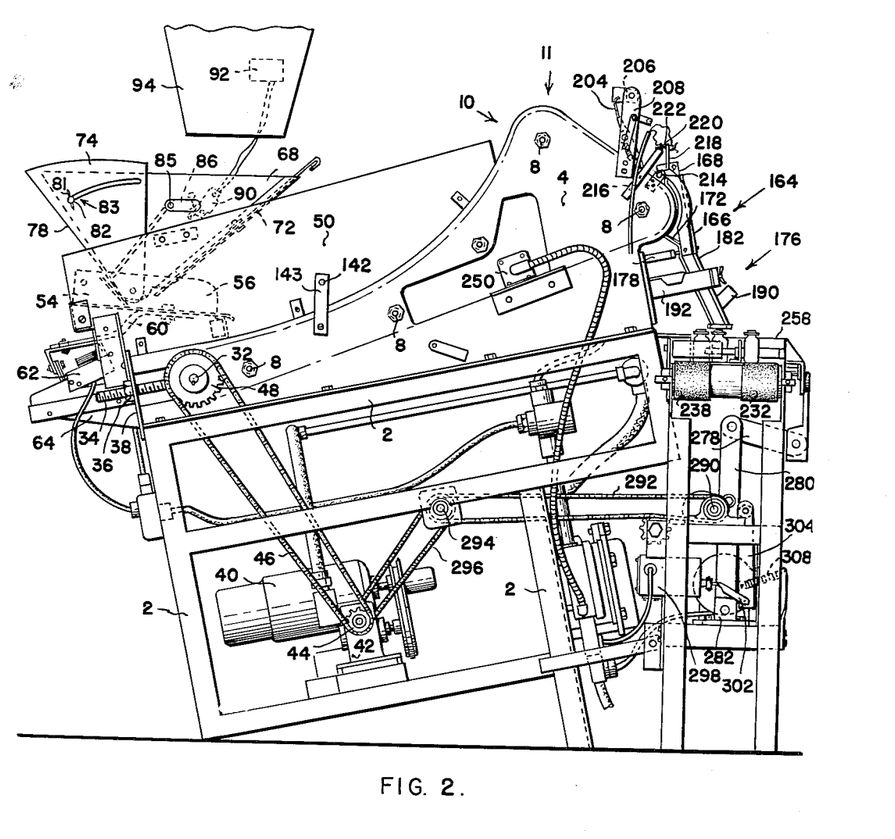
Figure 2 is a side elevation of the apparatus.

An arm 276 extends downwardly from and is rigidly attached to the bar 268 and is connected by means of a link 278 to the upper end of an arm 280 which extends downwardly from the link 278 and is pivoted at its lower end to a block 282 mounted within the framework 248. A cam follower 286 is mounted on the arm 280 and is adapted to roll on the surface of a cam 288. The cam 288 is rotatably mounted on a shaft 290 which is supported within suitable bearings mounted on a framework 291 within the famework 248. The shaft 290 is driven by means of a chain 292 through a conventional sprocket mounted on the shaft 290. The inner or left-hand end of the chain 292, as viewed in Figure 2, is carried by a sprocket mounted on a shaft 294 which is driven by a chain 296 and suitable sprockets mounted on the shaft 294 and on the shaft of sprocket 44 of the speed reducer 42 previously described.

A solenoid 298 is mounted on a suitable bracket 299 attached to the framework 291 and has its armature 300 connected to a link 302 which is, in turn, pivotally connected to the lower end of a bar 304 pivotally mounted at 306 to the framework 291. The upper end of the bar 304 above the pivot 306 mounts a roller 310.

A sprocket wheel 312 is fixedly mounted on the shaft 290. A headed pin 314 is mounted in one face of the cam 288 and pivotally mounts a dog 316 which is urged by means of a spring 318 to rotate in a counterclockwise direction around the pin 314 and engage the teeth of the sprocket wheel 312. The dog 316 is bevelled at 317 to permit the teeth of the sprocket wheel 312 to pass thereunder by camming the dog upwardly as the sprocket wheel rotates in a clockwise direction as viewed in Figure 5. In addition to the dog 316 there is pivotally mounted on the pin 314 a second dog 320. This dog has an extension 322 which includes a raised portion 324 adapted to cooperate with the roller 310 mounted on the bar 304. Additionally, there is provided on the pin 314 a spring member, not shown, serving to urge the dog 320 in a counterclockwise direction around the pin 314, thus causing the left-hand end of the dog 320, as viewed in Figure 5, to engage the teeth of the sprocket wheel 312 when the roller 310 is moved to the right upon energization of solenoid 298.

Figure 3:
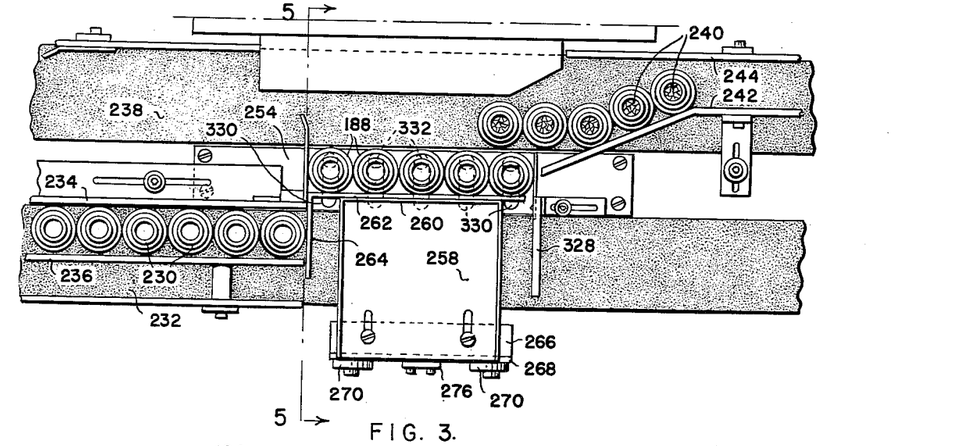
Figure 3 is a fragmentary plan view of the apparatus.

It should be noted that Figure 5 is drawn with the cam 288 and the mechanism operable thereby in its normal at rest position, that is, the position it assumes when containers, such as 188 shown in Figures 1, 2, 3 and 4B, are being filled with articles. Figures 1, 2, 3 and 4B show, however, the pusher plate 258 in the midpoint of its operative cycle. At that time, it has pushed bottles 188 into position to be filled and pushed bottles 240 out of the position in which they are shown in Figure 3 as being carried away. At this midpoint of the operation of the pusher plate 258, the plate has not yet moved backwardly to its normal at rest position as shown in Figure 5. By reference to Figure 5, it will be observed that the containers 236' on the conveyor belt 232 move into position to be pushed when the pusher assembly is in an at rest position and are in engagement with a stop bar 328 positioned across the conveyor 232 which serves to arrest travel of the containers 236' and 230. During this period of operation, the containers 236' are prevented from coming out of their normal position of alignment on the conveyor by the guide plates 234 and 236 previously described and by the guide bar 262 attached to the front of the pusher plate 258.

It will be evident that the apparatus thus far described will serve to retain the containers 230 in alignment and stationary with respect to the framework of the apparatus as the conveyor belt 232 moves. The bar 262 on the front of the pusher will prevent the bottles 236', shown in Figure 5, from moving outwardly as the conveyor slides thereunder. It will be evident, however, that the apparatus thus far described will not prevent the bottles 236' from buckling with respect to each other and moving inwardly onto the plate 252 and thus disarranging the bottles 188' positioned to receive articles from the conveyor through the receiver assembly.

To prevent this disarrangement, a plurality of studs 332 are projected upwardly through slots 330 in the plate 254. The studs 332 and the slots are so arranged that one stud is positioned in front of each of the bottles 236', as shown in Figure 5. This row of studs 332 prevents the bottles 236' from moving out of their in line position and, thus, disarranging the bottles 188 prior to a transfer operation.

The studs 332 are mounted on a bar 334 which extends transversely below the slots 330 in the plate 254. At each end of the bar 334 there is an outwardly extending tongue 336. Adjacent to each end of the bar and extending downwardly from the plate 254 there is a vertically positioned plate 338 in which there is provided a slot 340 adapted to receive the adjacent tongue 336. The tongue and the slots are inclined downwardly and to the left, as viewed in Figure 5. It will be evident that the slots and tongues cooperate so as to cause the studs 332 to move downwardly and to the left as the tongues pass along the slots 340, thereby moving the upper ends of the studs 332 downwardly to a position below the upper surface of the plate 254 when the tongues have moved to the lower left hand end portions of the slots 340, as viewed in Figure 5. A pair of springs 342 are attached one to each of the tongues 336 and serve to urge the bar 334 to the left, as viewed in Figure 5.

A member 244 is affixed to the left hand end of each of the rods 272, as viewed in Figure 5. The left hand portion of each of the members 244 has an upwardly extending portion 246 adapted to engage the left hand surface of the bar 334, as viewed in Figure 5, serving to restrain the bar 334 against the urging of the springs 342. Springs 248 are attached to each of the members 244 serving to urge the members to the left, as viewed in Figure 5.

In operation of the apparatus, when the articles are being fed to the bottles and the bottle transfer apparatus is at rest, the transfer apparatus will assume a position as shown in Figure 5. During this phase of the operation of the apparatus the bar 262 attached to the front of the pusher plate 258 and the studs 332 serve to retain a group of bottles 236' in position adjacent to the bottles 188' which are at rest upon the plate 254 between the two conveyors 232 and 238 and which are being filled with articles through the receivers. The transfer apparatus will remain stationary during the passage of a sequence of conveyor bars having article-carrying recesses therein past the article receivers. When the blank conveyor bars which separate successions of recessed conveyor bars are passing the article receivers and, thus, when no articles are being deposited in the receivers, the bottle transfer mechanism will be operated.

Operation of the bottle transfer mechanism is initiated by means of the limit switch 250 shown in Figure 4B which is supported by the side plate 4 in such a position as to be actuated by fingers 252 affixed to the conveyor chain 12 at spaced intervals equivalent to the spacings of the successions of article-carrying conveyor bar 16 and the fingers are so positioned as to actuate the bottle transfer mechanism during that period of time when blank conveyor bars 194 are passing the article receivers.

Actuation of the limit switch 250 will energize the solenoid 298, as will be hereinafter described in greater detail in conjunction with the wiring diagram of Figure 8. Energization of the solenoid 298 will cause the lower end of the bar 304 to be moved to the left, as viewed in Figure 5, permitting the dog 320 to move in a counter-clockwise direction around the pin 314 and be engaged by a tooth of the sprocket wheel 312. As has been previously noted, the sprocket wheel 312 is rotating in a clockwise direction whenever the conveyor 10 is being driven by the motor 40 and, thus, immediately upon actuation of the dog 320 the cam 288 will rotate in a clockwise direction. As the cam rotates, the cam follower 286 riding on the surface thereof is moved to the left as the surface of the cam recedes by the action of the spring 248 upon the members 244 and the rods 272. As the rods 272 and the members 244 move to the left, the bottles 236' are pushed to the left by the bar 262 and the studs 332 move to the left ahead of the bottles 236' as a result of the action of the springs 342 on the bar 334. The studs 332 fall completely below the plate 254 prior to their passage beyond the right-hand edge of the bottles 188' shown in Figure 5, and thus for the latter part of the bottle transfer operation, bottles 236' engage the bottles 188' and push the bottles 188' upon the conveyor 238, the bottles 236' then coming to rest in the position assumed by the bottles 188' as shown in Figure 5. The pusher plate 258 and the bar 262 mounted thereon reach this left-handmost position when the cam 288 has rotated approximately 120°. For the next following approximately 180° of rotation of the cam 288, the cam follower 286 is stationary in a period of dwell and, during the remaining 120° of rotation, the cam follower is moved to the left and the pusher and the studs 332 move to the right, as viewed in Figure 5, and return to the positions shown. After the parts have reached this position, the portion 264 of the bar 262 mounted on the pusher 258 will be clear of the row of bottles 230 as shown in Figure 3 and a succeeding group of bottles from the conveyor 232 will pass across in front of the pusher 258 and assume the position of the bottles 236' shown in Figure 5.

The actuation of the solenoid 298 by the engagement of the finger 252 with the limit switch 250 is momentary, being merely sufficient to permit the dog 320 to fall into engagement with the sprocket wheel 312 and commence rotation of the cam 288. Thus, after the cam 288 has made a complete rotation, the raised portion 324 of the extension 322 of the dog 320 engages the roller 310 mounted on the upper end of the arm 304 which will have returned to the position shown in Figure 5 and the dog 320 is lifted out of engagement with the associated tooth of the sprocket wheel 312. Thus, operation of the bottle transfer mechanism is arrested until the passage of the next finger 252 beneath the limit switch 250.

It will be noted that, during the first half revolution of the cam 288 in a clockwise direction, the weight of the cam and the dogs mounted thereon may cause the dog 230 to override the teeth of the sprocket wheel 312 and the cam 288 fall downwardly more rapidly than the sprocket wheel 312. It is to prevent this that the dog 316 is provided which, under such conditions, would engage the next leading tooth of the sprocket wheel and thus prevent the cam 288 from rotating more rapidly than the sprocket wheel 312. After the rotation of the cam 288 has been arrested by the raising of the dog 320 above the ends of the teeth of the sprocket wheel 312, the bevelled end of the dog 316 permits that dog to ride over each successive sprocket tooth as the sprocket rotates and, thus, the transfer apparatus remains stationary until a successive energization of the solenoid 298.

In operation of the apparatus, an operator will manipulate the switch 251 in order to energize the drive motor 253 driving the conveyor belts 232 and 238. The electrical connections between the motor 253, the switch 251, a suitable motor starter and a source of power are entirely conventional and need not be described in detail herein.

Figure 8:
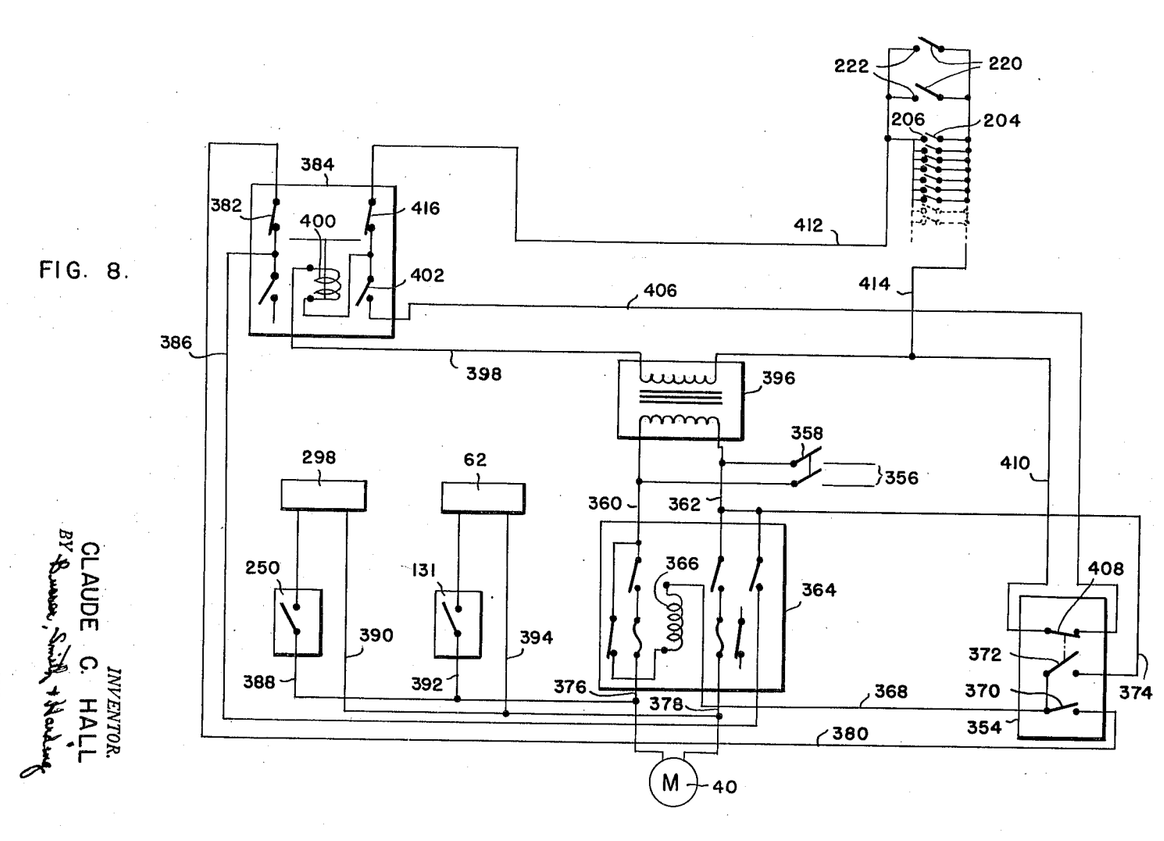
Figure 8 is a diagram showing the electrical connections within the apparatus.

The wiring diagram of Figure 8 shows the control circuit for the conveyor drive motor 40, the bottle change solenoid 298 and the tablet feed vibrator 62 which includes the stop-start switch 354. A suitable source of power 356 is connected through the disconnect switch 358 to conductors 360 and 362. Each of the conductors 360 and 362 is connected to a main contact of a motor starter 364. One end of the motor starter coil 366 is connected to the conductor 360. The other end of the motor starter coil is connected by conductor 368 to the common side of a pair of contacts 370 and 372 in the stop-start switch 354. When the start button of the stop-start switch 354 is depressed, the contact 372 is closed connecting the line 368 to a line 374 which is connected to the source of power through line 362. Thus the motor starter coil 366 is energized, closing the main contacts of the motor starter and energizing the motor 40 through lines 376 and 378. The motor starter coil 366 is also connected through line 368 and the switch 370 to a conductor 380 which is connected to one side of a normally closed contact 382 of a relay 384. The other side of the contact 382 is connected through line 386 to the third main contact of the motor starter 364 which is, in turn, connected to the power line 362. Thus, after the motor starter is energized by momentary closure of the contact 372, it is locked in by the circuit established by the normally closed contact 370, the contact 382 of the relay and the third main contact of the motor starter 364.

Conductors 388 and 390 are connected to the conductors 376 and 378, respectively. The bottle change solenoid 298 and the limit switch control 250 therefor are connected in series across the conductors 388 and 390 and thus, when the motor starter is closed, the bottle change solenoid may be energized under the control of the limit switch 250. Similarly, the tablet feed vibrator 62 and the limit switch control 131 therefor are connected in series across conductors 392 and 394 which are, in turn, connected across the conductors 388 and 390 and, thus, when the motor starter is energized, the tablet feed vibrator may be operated under the control of the limit switch 131 as previously described.

A transformer 396 is connected across the lines 360 and 362 and supplies low voltage power through conductor 398 to one side of the coil 400 of the relay 384. The other side of the coil 400 is connected through a normally opened contact 402 of the relay 384 to a conductor 406. The other end of the conductor 406 is connected to a normally closed contact 408 in the stop-start switch 354. The other side of the normally closed contact 408 is connected through conductor 410 to the secondary of the transformer 396. Thus the coil 400 of the relay 384 is normally deenergized as a result of being connected in series with the normally open contact 402 thereof.

The various safety switches 220—222 and 204—206, which are adapted to arrest the operation of the conveyor as previously described, are connected in series across a pair of conductors 412 and 414. The conductor 414 is connected to one side of the secondary of the transformer 396 through conductor 410. The conductor 412 is connected through the normally closed contact 416 of the relay 384 to the side of the relay coil connected to the normally open contact 402. The opposite side of the relay coil 400 is connected to the opposite side of the transformer secondary through conductor 389 as previously described.

Contacts 408 and 372 of the stop-start switch are the start contacts thereof and are interlocked so that, when the switch is at rest, the contact 408 is closed and the contact 372 is opened. When the start button is depressed, the contact 408 is opened and the contact 372 is closed. Closure of the contact 372 energizes the motor starter, as previously described, and causes the motor starter coil to be locked in the circuit through the normally closed contact 382 of the relay 384 as previously described.

When it is desired to stop operation of the motor, operation of the stop button of the stop-start switch 354 will open the contact 370, thus interrupting the circuit through the motor starter coil 366. In the event that any of the safety contacts 220—222 or 204—206 are closed, the circuit through the relay coil 400 is closed through the normally closed contact 416 thereof and the relay is energized, opening its contact 382 and thus deenergizing the motor starter coil 386. Upon energization of the coil 400 of the relay 384, the relay contact 402 will close and the relay coil 400 will be locked in the circuit through the contact 402 of the relay and the contact 408 of the stop-start switch. The contact 416 of the relay will open, thus deenergizing the safety switches 220—222 and 204—206 and thus prevent the relatively fine contact point from possibly overheating and, additionally, serving to deenergize this portion of the circuit while an operator of the machine may be handling articles in the vicinity of these contacts.

As previously described, the contacts 408 and 372 of the stop-start switch are interlocked and are both actuated when the start button is depressed. Thus, to start the apparatus an operator will press the start button closing the contact 372 and opening the contact 408. Opening the contact 408 will deenergize the relay coil 400 permitting the back contact 382 thereof to close and thus permitting the motor starter coil 386 to be again locked into the circuit through the contact 382 of the relay and through the stop switch contact 370.

It will be evident that the apparatus described provides highly reliable counting of articles and delivery of counted articles to containers therefor. It is additionally noted that the apparatus provides for a high rate of filling containers which is at least partially accomplished by the handling of containers in groups and by the structure which positions a group of containers in a position adjacent to the container filling position and retains the containers in proper alignment in this adjacent position in order that the adjacently positioned containers may be rapidly moved to the filling position and the filled containers at the filling position be displaced to the conveyor for removing filled containers.

It should be noted that, while in describing the apparatus reference has been made to a single article as being retained in each of the recesses, it is entirely possible that a definite number of articles may be contained within each of the recesses and serve to position the article sensing fingers which indicate the absence of an article in a recess. Thus the fingers could equally well serve to indicate the absence of a proper number of articles within a recess. Similarly, the shape of the recesses may be modified in order to more readily accommodate articles of any particular shape which are to be counted. These and other modifications may be made to the embodiment of the invention disclosed herein without departing from the scope of the invention as set forth in the following claims.

What is claimed is:

1. Article counting and packaging apparatus comprising a hopper for articles to be packaged, means responsive to articles in said hopper adapted to control means for supplying articles to the hopper, means for delivering a predetermined number of said articles from said hopper to a container, and means for replacing said container with a second container when said first mentioned container has received said predetermined number of articles.

2. Article counting and packaging apparatus comprising a hopper for articles to be packaged, an outlet for articles in the bottom of said hopper, means for delivering a predetermined number of said articles to a container, means between said hopper outlet and said delivering means for directing articles from said hopper outlet to said delivering means, means for vibrating said directing means, and means responsive to the number of articles carried by said delivering means for controlling the operation of said vibrating means.

3. Article counting and packaging apparatus comprising a hopper for articles to be packaged, an outlet for articles in the bottom of said hopper, means for delivering a predetermined number of said articles to a container, means between said hopper outlet and said delivering means for directing articles from said hopper outlet to said delivering means, means for vibrating said directing means and said hopper, and means responsive to the number of articles carried by said delivering means for controlling the operation of said vibrating means.

4. Article counting and packaging apparatus comprising a hopper for articles to be packaged, an outlet for articles in the bottom of said hopper, means including a conveyor for delivering a predetermined number of said articles to a container, means between said hopper outlet and said conveyor for directing articles from said hopper outlet to said conveyor, means for vibrating said directing means, and means responsive to the number of articles on said conveyor for controlling the operation of said vibrating means.

5. Article counting and packaging apparatus comprising means including a conveyor for delivering a predetermined number of articles to a container, means for supplying articles to said conveyor, said conveyor including a plurality of adjacently positioned removably mounted transversely extending members, a row of recesses extending longitudinally of each member, means including pins carried by each of said members positioned to enter said recesses for discharging articles from said recesses, and means responsive to the displacement of a member from said conveyor upon operation of said article discharging means for arresting operation of the conveyor.

6. Article counting and packaging apparatus comprising a hopper for articles to be packaged, means responsive to articles in said hopper adapted to control means for supplying articles to the hopper, means for simultaneously delivering a predetermined number of articles from said hopper to each of the containers of a group of empty containers to simultaneously effectively fill each of the containers of the group, and means for simultaneously replacing each of the containers of the filled group with a second container to be filled.

7. Article counting and packaging apparatus comprising means including a conveyor for delivering a predetermined number of articles to a container, means for supplying articles to said conveyor, said conveyor including longitudinally extending rows of recesses adapted to receive articles to be delivered to the container, means mounting said conveyor for travel first in an upwardly inclined direction away from said supplying means and thereafter in a downward direction toward the container, and means including a row of pivotally mounted fingers extending transversely of the upwardly inclined portion of said conveyor and having their free ends resting on said conveyor in alignment with the longitudinally extending rows of recesses therein for preventing articles from being carried to the container by said conveyor other than in recesses therein.

8. Article counting and packaging apparatus comprising means including a conveyor for delivering a predetermined number of articles to a container, means for supplying articles to said conveyor, said conveyor including a plurality of transversely extending members and a row of recesses extending longitudinally of each of said members, said recesses being adapted to receive articles to be delivered to the container, and means including a row of pins carried by each of said members positioned in alignment with the recesses therein and means for moving the pins into the recesses for discharging articles from said recesses in said conveyor.

9. Article counting and packaging apparatus comprising a hopper for articles to be packaged, means for simultaneously delivering a predetermined number of articles from said hopper to each of the containers of a group of empty containers to simultaneously effectively fill each of the containers of the group, and means for simultaneously replacing each of the containers of the filled group with a second container to be filled.

10. Article packaging apparatus comprising means for simultaneously delivering articles to each container of a group of containers in an article receiving position, means for positioning a succession of groups of containers in said article receiving position to receive delivered articles, said positioning means including means for delivering successive groups of containers to a position adjacent to said article receiving position and means for transferring successive groups of containers from said adjacent position to said article receiving position and displacing successive groups of containers from said article receiving position, and means for removing successive displaced groups of containers.

11. Article packaging apparatus comprising means for simultaneously delivering articles to each container of a group of containers in an article receiving position, and means for positioning a succession of groups of containers in said article receiving position to receive delivered articles, said positioning means including a conveyor for delivering groups of empty containers to a position adjacent to said article receiving position, means for arresting motion of successive groups of empty containers on said conveyor in said adjacent position, means for successively transferring arrested groups of empty containers from said adjacent position to said article receiving position and displacing successive groups of filled containers from said article receiving position, and a conveyor for carrying off displaced groups of filled containers.

12. Article packaging apparatus comprising means for simultaneously delivering articles to each container of a group of containers in an article receiving position, and means for positioning a succession of groups of containers in said article receiving position to receive delivered articles, said positioning means including a conveyor for delivering groups of empty containers to a position transversely adjacent to said article receiving position with respect to the direction of conveyor travel, means for arresting motion of successive groups of empty containers on said conveyor in said adjacent position, stop means for preventing transverse motion of the containers of each successive group of adjacently positioned containers toward the article receiving position, means for successively transferring arrested groups of empty containers transversely from said adjacent position to said article receiving position and displacing successive groups of filled containers transversely from said article receiving position, means displacing said stop means upon operation of said transferring means to permit transfer of a group of containers from said adjacent position to said article receiving position, and a conveyor for carrying off displaced groups of filled containers.

References Cited in the file of this patent

UNITED STATES PATENTS

| | | |
|---|---|---|
| 824,463 | Ayers et al. | June 26, 1906 |
| 1,346,613 | Taliaferro et al. | July 13, 1920 |
| 1,460,778 | Wilkie | July 3, 1923 |
| 2,307,415 | Malhiot | Jan. 5, 1943 |
| 2,333,232 | Bleam et al. | Nov. 2, 1943 |
| 2,509,069 | Mrachek | May 23, 1950 |
| 2,550,616 | Stephano | Apr. 24, 1951 |
| 2,656,962 | Daniels | Oct. 27, 1953 |
| 2,661,133 | Clement | Dec. 1, 1953 |